United States Patent Office 2,805,874
Patented Sept. 10, 1957

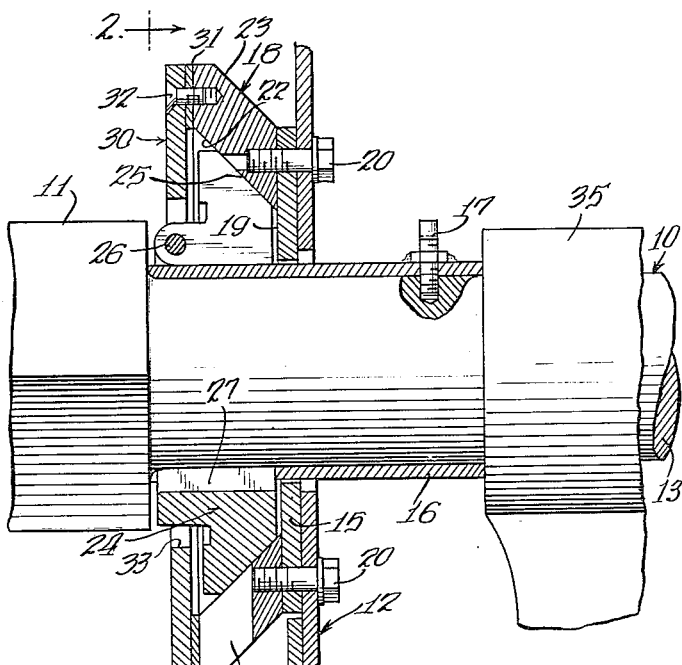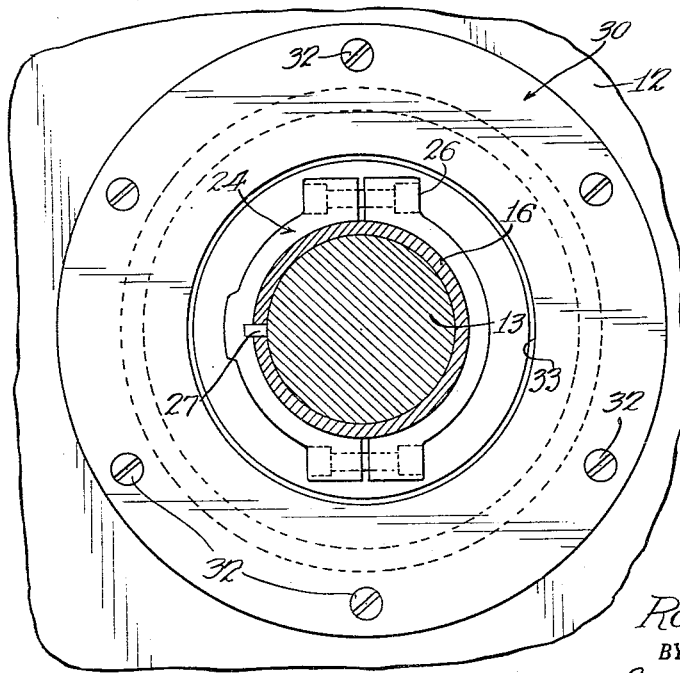

2,805,874

PUG MILL SHAFT SEAL

Robert F. Plumb, Cedar Rapids, Iowa, assignor to Iowa Manufacturing Company of Cedar Rapids, Iowa, Cedar Rapids, Iowa, a corporation of Iowa Application August 24, 1954, Serial No. 451,800

3 Claims. (Cl. 286—11.13)

This invention relates to sealing devices and more particularly to a seal for the ends of a mixer shaft as in pug mills and like devices.

Briefly, this invention concerns a sealing device capable of preventing infiltration or leakage of fine matter through an opening in a wall through which a shaft passes, as for example in a pug mill. It is obvious that the invention has utility in other fields, but it has been found to be especially effective in the class of machines termed pug mills and for that reason the illustrated embodiment herein will be described in association with such a machine.

The features of the improved sealing device of this invention are arranged to prevent the flow of gritty, fine, dry materials through the opening for the shaft supporting the paddle mechanism in a pug mill, for example. Means are also provided for permitting escape of such gritty, fine, dry materials coming into the seal assembly. It is familiar that crushed or ground materials, for example aggregates of various sizes, glazing material and like fine, dry, gritty substances, cause extreme wear of metal surfaces with which they are brought into contact. Such wear and attrition is especially damaging in the case of seals for paddle assemblies or like agitators in pug mills. In the essence the subject invention comprises a split seal assembly having improved means for sealing a paddle shaft of a pug mill for endwise leakage of fine, dry material. Means are embodied in the seal to permit the escape of gritty, fine, dry materials which chance to leak into the seal device.

The main object of this invention is to provide a new and improved seal device for shafts related to devices in which gritty, fine, dry materials are disposed in adjacency to the shaft opening, as for example in pug mills and like devices.

Another object of this invention is to provide a new and improved combination seal device in which means are provided for substantially preventing the leakage of gritty, fine, dry materials, dirt or like foreign substances through the seal.

A further important object of this invention is to provide a new and improved sealing device for use in pug mills for paddle wheel shafts and the like which is constructed and has means embodied therewith to permit the carrying away of any gritty or foreign substances which happen to leak into the sealing assembly.

The above and further objects, features and advantages of this invention will be recognized by those familiar with the art from the following detailed description and specifications therefor and will be readily more understandable when considered in conjunction with the illustrated preferred embodiment thereof found in the accompanying drawings.

In the drawings:

Figure 1 is a substantially full cross sectional view taken at the longitudinal center line of the improved sealing device of this invention with the shaft supported by a bearing illustrated fragmentarily and in elevation; and Figure 2 is an end elevational view of the assembly illustrated in Figure 1 with parts thereof being shown in cross section taken substantially on line 2—2 of Figure 1.

Turning now to the drawings and the features of this invention illustrated, it will be recognized that a shaft 10 representative herein of a typical paddle shaft associated with the agitating system of a pug mill is formed with an enlarged hub portion 11. The shaft is mounted through an end wall or plate 12 of the pug mill housing outside of which it is supported for rotation by a radial and thrust bearing 35 of suitable known type. While the drawings illustrate but one seal assembly and one bearing 35, it is known to those familiar with the art that a paddle shaft, such as shaft 10 shown, is supported in the pug mill adjacent its opposite ends.

As stated, the shaft 10 is to be suitably rotated or driven in the operation of the mill and has end portions 13 adjacent the enlarged hub portion 11 which extends through the wall or plate 12 of the mixer or pug mill. A seal riser 15 formed as an annulus from cyanide hardened metal is fixed to an innerface of the wall or plate 12 and closely surrounds a tubular spacer collar 16 encasing the shaft portion 13 immediately adjacent the hub portion 11 and extending axially outward from the latter portion. The spacer collar or sleeve 16 is fixed to the shaft portion 13 by a setscrew means 17 or the like. A steel seal ring 18 is joined at one end to the innerface 19 of the annulus or seal riser 15 as by a plurality of bolt members 20. It will be regarded that the seal ring 18, riser member 15 and plate 12 are joined in a rigid fashion by the presence and action of the bolts 20. It will further be regarded that seal ring 18 is formulated as to comprise an internal frusto-conical surface 22 paralleled by a similar frusto-conical outer wall 23; the surface 22 and the wall surface 23 being separated by the presence of the material comprising the main body portion of the seal ring 18. Note that the seal ring 18 is arranged in concentric fashion radially outward of sleeve 16 and spaced therefrom a suitable distance for receiving a split "Nihard" seal member 24 having a frusto-conical surface 25 for engaging the sealing surface of the seal ring. As best shown in Figure 2 of the drawings, the split seal member 24 is clamped about the spacer member 16 by a pair of bolts 26—26 and is further keyed to the spacer sleeve 16 by key means 27. By this arrangement, the seal member 24 remains stationary with respect to the sleeve 16, but is rotatable with the shaft 10, as is the sleeve member 16.

In their normal interfitted relation as shown in Figure 1 of the drawings, the seal ring 18 and the seal member 24 contact each other lightly at surfaces 22 and 25, respectively. An annular cover plate 30 is secured to the seal ring 18 over an annular adjusting spacer 31 by a plurality of spaced screws 32 (best shown in Figure 2). Such cover member prevents disassociation of the seal ring and seal member.

It will be recognized from the above description that the several elements which comprise my invention have been set forth. Of particular importance to the successful operation of this combination is the relationship which the seal member 24 maintains with respect to the seal ring 18. As will be understood, the seal member 24 rotates freely between the adjacent inside face of the cover plate 30 and the frusto-conical face 22 of the seal ring member 18, restricted endwise only by the thrust and radial bearing 35.

Of further importance in the described combination is the provision in the cover plate 30 of an enlarged central opening indicated at numeral 33. This opening permits fine, dry materials from the interior of the pug mill to escape into a chambering system built within the improved seal device of this invention. Since it is impossible to prevent entirely the escape of some attritional materials into the seal it is of importance to provide a convenient escape means for such material before it has the opportunity of reaching the seal surfaces. To this end, in addition to opening 33 in the cover plate 30, I have provided a channel or exit opening 34 formed in the seal ring 18 and near the bottom of such ring as seen in Figure 1. Therefore, any material escaping from the pug mill and entering the seal assembly via the central opening 33 of the cover plate will be immediately channeled around the adjacent end of the split seal member 24 and permitted to escape via the discharge opening 34 in the seal ring 18 back into the mixer. As a result of this construction very little, if any, of the dangerously damaging abrasive, fine, dry materials come into actual contact with the seal surfaces 22 and 25 of the two related seal members 18 and 24.

From the above description and discussion it will be appreciated that I have herein described and disclosed the features of an improved combination or assembly for an efficiently operative sealing device especially useful with shafts in mixers or like machinery in which the agitation of abrasive materials is carried out. By providing the frusto-conical seal face for this type of sealing assembly, the same is arranged to give a minimum amount of wear. Further, while it is to be assumed and realized that various changes, modifications and substitutions of equivalents may be employed when practicing the concepts of this invention, it is not believed that such will necessarily depart from the spirit and scope of the invention herein disclosed and described. As a result, it is not my intention that I be limited to the particular features of the embodiment shown in the drawings, except as may appear in the following appended claims.

I claim:

1. In shaft seal means for mills for treating abrasive materials, a housing for reception of material to be treated, a rotatably mounted shaft in said housing extending through a wall thereof, a seal ring fixed to said wall extending therefrom about said shaft in concentric spaced relation thereto, a seal member fixed on said shaft for rotation therewith and having sealing contact with said ring, said ring being concentric with said seal member and the latter being sectional with the sections thereof clamped on said shaft, and a cover plate mounted on the inner end of said ring extending radially inward beyond the periphery of said seal member and spaced from said shaft providing an annular space opening from the interior of said housing to said seal member, said seal ring being provided at its lower portion with a substantially radial discharge opening.

2. In shaft seal means for mills for treating abrasive materials, a housing for reception of material to be treated, a rotatably mounted shaft in said housing extending through a wall thereof, a substantially frusto-conical seal ring fixed to said wall extending therefrom about said shaft in concentric spaced relation thereto and flaring inward, and a seal member fixed on said shaft for rotation therewith and having a frusto-conical outer face in sealing contact with the inner face of said seal ring, said seal member being sectional with the sections thereof clamped on said shaft and said seal ring being provided at its lower portion with a substantially radial discharge opening.

3. In shaft seal means for mills for treating abrasive materials, a housing for reception of material to be treated, a rotatably mounted shaft in said housing extending through a wall thereof, a substantially frusto-conical seal ring fixed to said wall extending therefrom about said shaft in concentric spaced relation thereto and flaring inward, a seal member fixed on said shaft comprising a substantially frusto-conical body and a reduced inwardly extending hub secured on said shaft, the outer face of said seal member having sealing contact with the inner face of said seal ring, said seal member being sectional with the sections thereof clamped on said shaft and said seal ring being provided at its lower portion with a substantially radial discharge opening, and a cover plate mounted on the inner end of said seal ring spaced inwardly from the inner face of said seal member and extending radially inward beyond the periphery thereof, said plate extending about said hub in spaced relation thereof providing therewith a substantially annular space opening from the interior of said housing.

References Cited in the file of this patent
UNITED STATES PATENTS

| | | |
|---|---|---|
| 1,166,201 | Fritchle | Dec. 28, 1915 |
| 2,444,249 | Estey | June 29, 1948 |